May 19, 1931.  H. R. THORNBURGH  1,805,605
STADIA ROD
Filed May 13, 1929
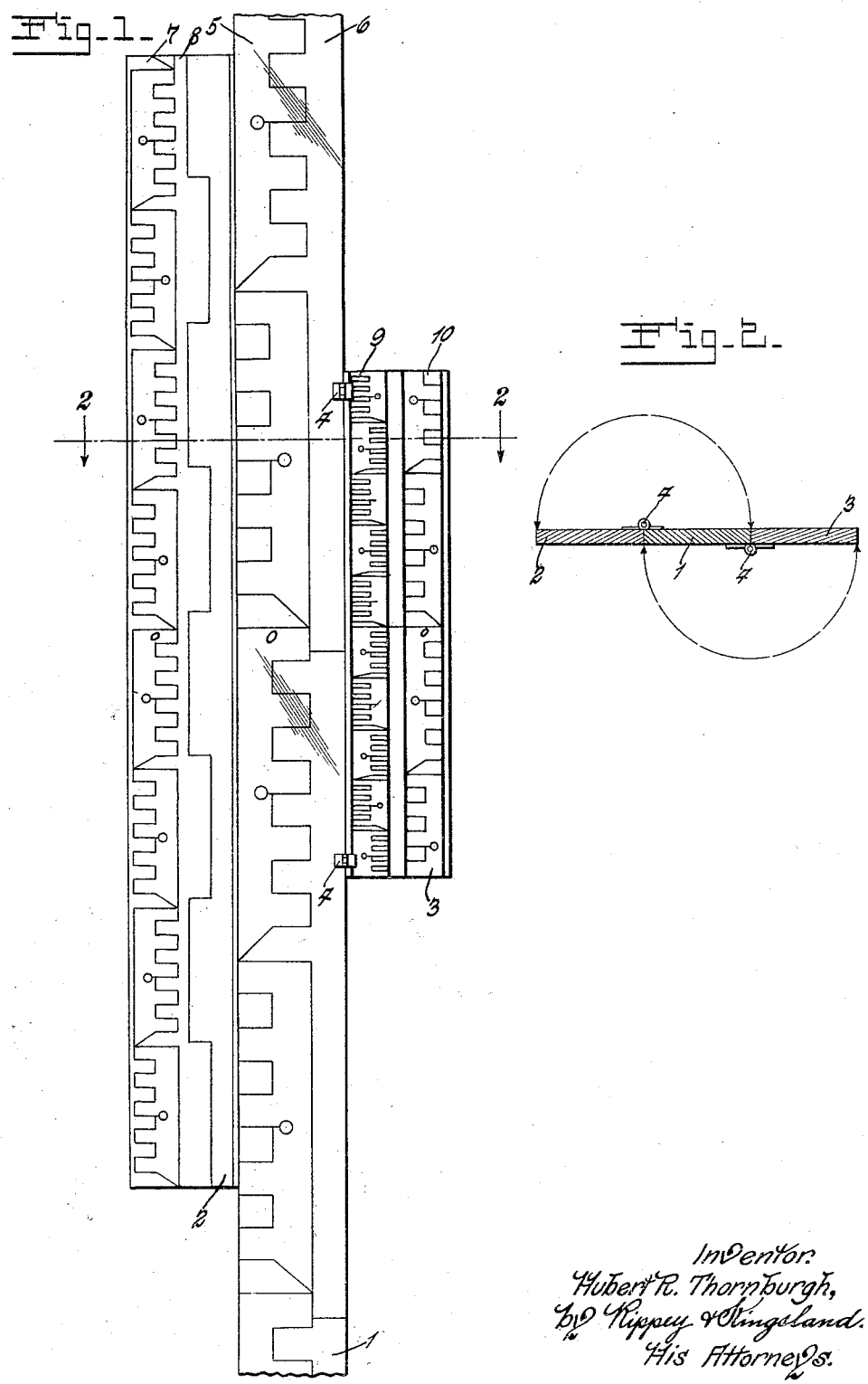
Inventor:
Hubert R. Thornburgh,
by Rippey & Kingsland.
His Attorneys.

Patented May 19, 1931

1,805,605

UNITED STATES PATENT OFFICE

HUBERT R. THORNBURGH, OF LEONIA, NEW JERSEY, ASSIGNOR TO SHELL PETROLEUM CORPORATION, A CORPORATION OF VIRGINIA

STADIA ROD

Application filed May 13, 1929. Serial No. 362,639.

This invention relates to improvements in stadia rods, and consists in the novel construction hereinafter disclosed.

In performing gravimetric torsion balance surveys the field measurements are required to be corrected for the influence of ground irregularities in the vicinity of the stations of the survey. The influences that result from the topography of the ground are calculated for each station. Certain formulæ have been evolved for performing the necessary calculations. Originally the so-called Eotvoes formulæ were used, and later the Schweydar formulæ came into use. Both formulæ require that certain ground height differences at each station be measured in the field. From these reading the land influences, that is to say the influence of the topography of the ground, are calculated. At any given station these height differences are now determined by transit or level readings on a centimeter rod, which is held on certain predetermined points around that station. The particular points are at the intersections of lines radiating from the station and circles of definite radii concentric on the station.

Under the Schweydar method each circle of levelment is considered in turn. The ground heights at a constant distance from the station, read at the various angle intervals around the station, constitute what is known as a "ground height-azimuth" curve, that is mathematically to give four coefficients, which are sufficient for the calculations necessary for obtaining the results under this method. There are thus four of these coefficients for each circle of levelment, and as many sets of four as there are circles of levelment.

The four quantities which together constitute the land influence at a station consist of two "gradient" and two "curvature" quantities. If these factors are denoted by $G_1$, $G_2$; $C_1$ and $C_2$ the Schweydar formulæ can be written:

$$G_1 = K(k_1 b_1 + k_2 b_2 + k_3 b_3 + \cdots k_{n-1} b_{n-1} + k_n b_n)$$
$$G_2 = K(k_1 c_1 + k_2 c_2 + k_3 c_3 + \cdots k_{n-1} c_{n-1} + k_n c_n)$$
$$C_1 = K(l_1 d_1 + l_2 d_2 + l_3 d_3 + \cdots l_{n-1} d_{n-1} + l_n d_n)$$
$$C_2 = K(l_1 e_1 + l_2 e_2 + l_3 e_3 + \cdots l_{n-1} e_{n-1} + l_n e_n)$$

Where K is a constant depending on the density of the ground irregularities; $k_1$ $k_2$ $k_3 \ldots k_n$ are a set of (gradient) constants, one for each circle of levelment; $l_1$ $l_2$ $l_3 \ldots l_n$ are a set of (curvature) constants, different from the above, but for the same circles of levelment, and $b$, $c$, $d$ and $e$ are the ground height coefficients for the various circles denoted by subscript.

Under the present method the mathematical calcuation of a single land influence consists of the following:

(1) Height differences, determined from the rod readings, (2) height coefficients, computed from these height differences, one set of four for each circle of levelment; (3) each individual coefficient multiplied by its radius constant; (4) the products of like coefficients totaled, and (5) the sum multiplied by a density constant.

While the Eotvoes formula is developed on a slightly different assumption, the final calculation can be brought under exactly the same equations as set out above, the only difference between the two methods being a numerical difference in radius constants.

The present method of calculations, which originate from readings on a centimeter rod, are cumbersome and, because of the separate operations and the presence of both plus and minus signs in height differences, accurate computations are difficult.

Another element that injects inaccuracy in the computations under the present method results from the fact that the radius constants for the closer radii of levelment are very much larger than those for the more distant ones. This makes the uniform intervals on the centimeter rod as the unit of height differences for the closer radii larger than necessary, while for the more distant radii the same interval is too small for accurate work.

The object of the present invention is to provide a rod whereby the calculations for determining the correction figures, necessary as a result of the topography of the land in the vicinity of the station, may be greatly simplified and the accuracy of the gravimetric torsion balance survey increased. The specific advantages of the construction will be apparent from the following detailed description thereof taken in connection with the accompanying drawings, in which—

Fig. 1 is a front elevation of one face of the rod showing an embodiment of the invention.

Fig. 2 is a cross section on the line 2 of Fig. 1.

In the embodiment of the invention as illustrated in the drawings, the rod is shown as including a central member 1 which in practice consists of a single board approximately ten feet in length and of suitable width and thickness. To the marginal edges of the member 1 are hinged leaves 2 and 3, said leaves each comprised of suitable length to accommodate the scales. The leaves 2 and 3 are of unequal length. The hinges 4, supporting the respective members 2 and 3, are placed on opposite faces of the member 1 so that each leaf 2 and 3 may be folded against an opposite face of said member 1 or extended, as illustrated in Fig. 1 of the drawings.

Each face of the members 1, 2 and 3 carries a pair of graduations forming scales 5 and 6, 7 and 8, and 9 and 10, respectively. It will be understood that upon the reverse sides of each of the members 1, 2 and 3 there are additional scales of a similar type, with different intervals. The scales 5, 7 and 9, having the smaller divisions, are the scales that are graduated for separate radius of levelment for the curvature quantities, and the scales 6, 8 and 10 are for the gradient quantities.

It will be remembered that in performing the calculations for each radius of levelment, according to the above formulæ, there are two constants, one for gradient quantities and one for curvature quantities—designated by $k$ and $l$ in the formulæ. Each of the gradient scales, for example, for the radius $n$ instead of being graduated in centimeters, is graduated in $l/k_n$ units, so that instead of reading "$h$" centimeters, it reads ($h$ times $k_n$) units. Similarly, the curvature scale for each of the radius $n$ is graduated in ($l/l_n$) units, so that it reads ($h$ times $l_n$) units, instead of $h$ centimeters.

Therefore, by the use of the device of the present invention the multiplication of the height difference by radius constant is performed directly, the product being read directly. This direct reading avoids error and also eliminates one of the steps of calculation now necessary under the present method.

While I have shown a specific form of rod, it should be borne in mind that the exact construction is not material, but that the several scales, one for each radius of levelment, may be displayed on rods or structures of different form. It is important only that the rods shall include a plurality of scales that may be read by transit or level readings, and that each pair of scales on the separate faces of the rod are coordinated directly for a specific radius of levelment, and there the intervals correspond to the specific constant for the gradient quantities and for the curvature quantities times the height unit.

It should be noted that the scales as illustrated are of the self-reading character, that is to say, they are graduated above and below the zero point. It should be noted also that it is unnecessary for the zero scale to coincide exactly with the instrument height, as the method of calculation of the height coefficients automatically eliminates any existing difference, provided the zero point is kept the same distance from the ground, and provided the instrument set-up height remains unchanged throughout the reading of the station.

From the foregoing it will be understood that by the use of the rod of the present invention there is no necessity of multiplication by the radius constants and that the reading on the gradient scale is in proportion to the reading on the curvature scale, so that the readings are self checking.

A further advantage of the rod of the present invention is that when it is held at the proper distances, ground heights giving equal scale readings produce equal influence at the stations. The operators, therefore, automatically use the correct precision at the various distances, that is to say, the intervals on the scales being coordinated with the distances from the station, the transit and level readings by the operators tend to be much more accurate than where a common interval is used for both the near and far points of reading from the station.

The provision of the rod, therefore, accomplishes a real advance in accuracy and speed of performing gravimetric torsion balance surveys.

I am aware that my invention may be modified in numerous particulars without departing from the spirit and scope thereof, but what I claim and desire to secure by Letters Patent is:

1. A stadia rod for use in gravimetric torsion balance surveys comprising a plurality of faces, each face having a pair of parallel scales thereon, one of said scales being graduated to represent a constant for a separate predetermined radius of levelment times the height, and the other of said scales being graduated to represent a different constant times the height unit.

2. A rod for use in gravimetric torsion balance surveys in which a constant gradient factor and a curvature factor are required to be determined for separate radii of levelment, comprising a rod having a plurality of faces, each face coordinated for each separate radius of levelment, and each face having two scales, one representing the height unit for the predetermined radii of the level times the gradient constant, and one for said radii of level representing the curvature constant times the height unit.

HUBERT R. THORNBURGH.